June 24, 1952 A. J. BESSONNET ET AL 2,601,239

SUBSTITUTING KEYBOARDS FOR DIALS IN TELEGRAPH SYSTEMS

Filed Aug. 2, 1947 6 Sheets-Sheet 1

Inventors
AUGUSTE JEAN BESSONNET
PIERRE CHARLES BOREL

By R P Morris
ATTORNEY

June 24, 1952 A. J. BESSONNET ET AL 2,601,239

SUBSTITUTING KEYBOARDS FOR DIALS IN TELEGRAPH SYSTEMS

Filed Aug. 2, 1947 6 Sheets-Sheet 2

Inventors
AUGUSTE JEAN BESSONNET
PIERRE CHARLES BOREL

By

R P Morris

ATTORNEY

SUBSTITUTING KEYBOARDS FOR DIALS IN TELEGRAPH SYSTEMS

Inventors

AUGUSTE JEAN BESSONNET
PIERRE CHARLES BOREL

BY

ATTORNEY

June 24, 1952 A. J. BESSONNET ET AL 2,601,239

SUBSTITUTING KEYBOARDS FOR DIALS IN TELEGRAPH SYSTEMS

Filed Aug. 2, 1947 6 Sheets-Sheet 4

Inventors

AUGUSTE JEAN BESSONNET
PIERRE CHARLES BOREL

BY

ATTORNEY

SUBSTITUTING KEYBOARDS FOR DIALS IN TELEGRAPH SYSTEMS

Filed Aug. 2, 1947 6 Sheets-Sheet 5

Inventors
AUGUSTE JEAN BESSONNET
PIERRE CHARLES BOREL

By

R. P. Morris
ATTORNEY

Inventors
AUGUSTE JEAN BESSONNET
PIERRE CHARLES BOREL

By

ATTORNEY

Patented June 24, 1952 2,601,239

UNITED STATES PATENT OFFICE 2,601,239

SUBSTITUTING KEYBOARDS FOR DIALS IN TELEGRAPH SYSTEMS

Auguste Jean Bessonnet and Pierre Charles Borel, Boulogne-Billancourt, France, assignors to International Standard Electric Corporation, New York, N. Y., a corporation of Delaware Application August 2, 1947, Serial No. 765,692
In France July 26, 1946

Section 1, Public Law 690, August 8, 1946
Patent expires July 26, 1966

2 Claims. (Cl. 178—3)

The present invention relates to devices for receiving and repeating telegraphic signals.

The invention relates more particularly to the recording of telegraphic signals for a delayed repetition of the signals as they have been received or a translation of the signals to control, for instance, an automatic switching device or any other telecontrol system in which it is economical to utilize a code system for transmission of signals.

In the automatic telegraphic exchanges, it is well known to use for controlling selectors, pulses sent by a dial identical to the dials used in automatic telephony systems.

Such a system has several disadvantages which may be summarized as follows:

In the first place, the length of time necessary to operate the dial and to send the digits which is of about one second; and in the second place the necessity to add to the telegraphic apparatus one additional device, namely, a dial which is used only for a short time when a call is initiated.

One object of the invention is to make it possible to send the digits received in one exchange to another exchange or to several other exchanges when the completion of the call involves two or several automatic telegraphic exchanges.

Another object of the invention is to standardize the control box associated with the telegraphic apparatus connected to an automatic network, so that the control boxes are the same for manual operation and automatic operation.

In addition to the features mentioned above, the present invention makes it possible to take advantage of the use of the five-element telegraphic code for sending signals.

A dial gives only 10 possible combinations (numbers 1 through 0), the keyboard of a telegraph set gives 32 different combinations with 5 relays, the number of combinations being equal to $2^5=32$. It is therefore possible to send by means of the keyboard, in addition to the 10 digits, all other combinations necessary to the exploitation of a modern telegraphic network (calling Information or Repair etc.).

It is also possible while a call is being completed through several exchanges, to send to the originating exchange, indications as to the condition of the calling subscriber (busy, out-of-order, disconnected, transferred, etc.) by means of a single signal, the transmission of which does not exceed 140 milliseconds. It is thus possible to free immediately the junctions between exchanges and therefore to improve their efficiency.

It is also possible, according to the invention to simplify the operation to be made by the subscriber when he initiates a call, so that he has only to type on his keyboard the number of the desired party in the same way as he will later on send his message; moreover, the number sent by the calling subscriber is printed in ordinary characters on the paper of his machine and he may thus check it.

In a more general manner, one object of the invention is to provide telecontrol devices which, although intended to be used with telegraphic equipment, may also be used in other fields.

According to one feature of the invention, it is possible to send the number of the called subscriber by using the keyboard provided on the telegraph set placed at the disposal of the subscriber. In this case, if the normal telegraphic code is used (telegraphic alphabet of the C. C. T. I.) the transmission of one number by the telegraph keyboard is approximately ten times faster, since it lasts only 140-milliseconds.

According to one of the features of the invention, counting relays are operated in synchronism with the code signals received by a telegraph relay. These counting relays send the impulse on marking relays which are operated or remain idle, according to the nature of the pulses received by the telegraph relay.

According to another feature of the invention switching relays send on recording relays code signals received by the marking relays associated with the counting relays, making these relays available for the reception of several numbers.

According to one other feature of the present invention, the code signals recorded by the recording relays are transferred on a local marking system in a register where they are repeated for retransmission.

This repetition is made by means of a synchronizing device operating the counting relays and successively connecting one contact of the recording relays, this contact being given a positive or negative polarity, according to the position of the marking relays translating the received code signal.

According to another feature of the invention, switching relays are used for the transmission of several numbers by successively connecting the different sets of marking relays.

These devices may be used for telecontrol systems.

The invention will be better understood by referring to the following description of an embodiment in relation to the drawings in which.

Before entering into the description of an embodiment of the invention, it must be recalled that, according to present common practice, one number or other character transmitted by a telegraphic apparatus is composed of seven elementary signals, each of a duration of 20 milliseconds, that is to say, 140 milliseconds.

These signals comprise, according to present practice, the "start" signal which is a negative signal, five code signals which may be positive or negative according to the code combination shown; and finally, a seventh and last signal called "stop" signal which is a positive signal. This code signal has been adopted in the embodiment of the invention which is going to be described.

Figure 8:
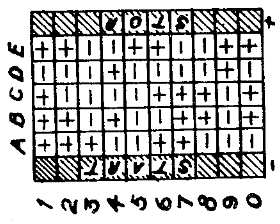
Figure 8 is a table of the code system used for numbers in one embodiment of the invention.

In the embodiment of the invention shown on the drawings, use is made of a telegraphic apparatus utilizing for transmission the signal code of the International Telegraphic Alphabet No. 2, shown in Figure 8; it is clear that the choice is not limitative and that any other code might be used.

Figure 2:
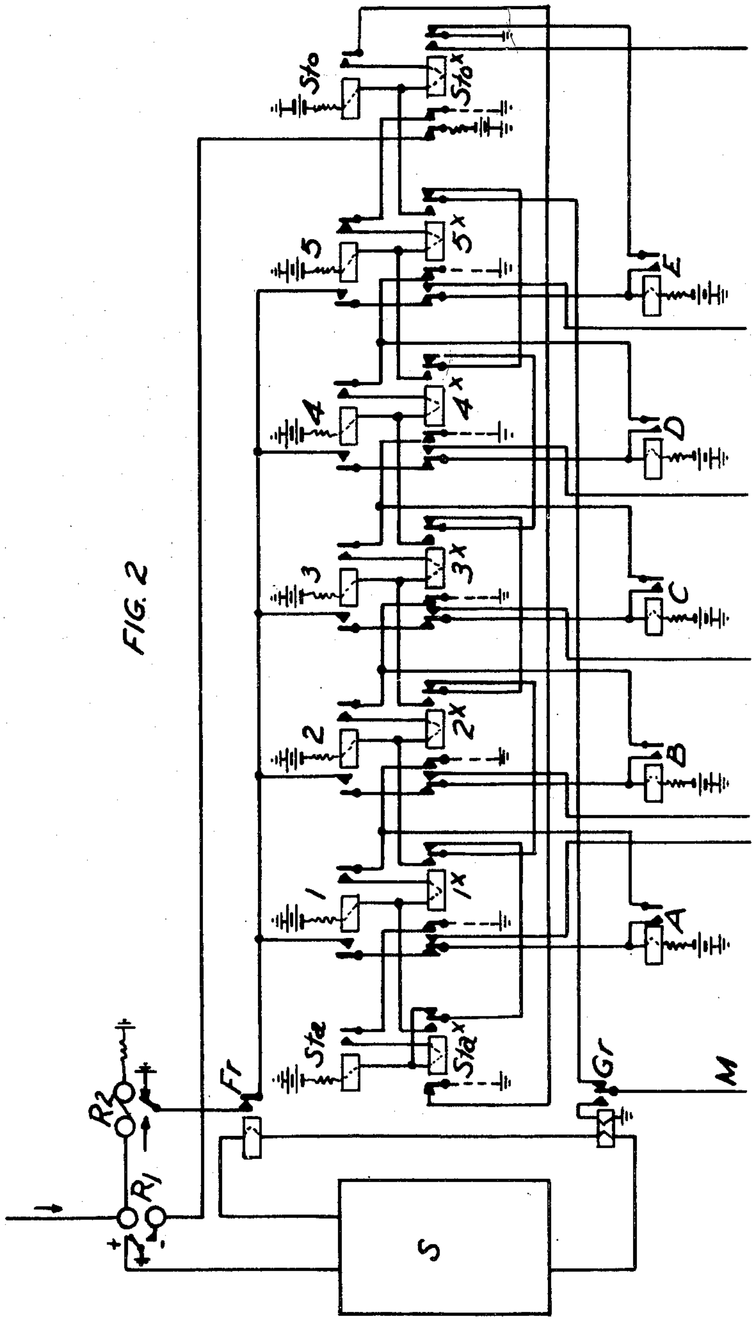
Figure 2 is the schematic of a receiving circuit incorporating the features of the invention.

The telegraphic signals transmitted by the calling subscriber are received on two telegraphic relays $R_1$ and $R_2$ (Fig. 2). The first of these relays is used only to control the operation of the synchronizing device between the receiver and the transmitter.

This synchronizing device S divides the time in two elements of 20 milliseconds each. It may be a mechanical device (not shown), for example a cam associated with a friction clutch and a shaft revolving at a constant speed, this cam operating a switch. This switch, which is closed every 20 milliseconds, operates a set of counting relays.

This device may also be replaced by a circuit utilizing tubes, such as cold cathode tubes or other kind of tubes giving impulses every 20 milliseconds.

The second relay $R_2$ receives the telegraphic signals transmitted by the subscriber.

Every impulse sent by the synchronizing device operates a pair of counting relays according to a known method which will be described later.

The first impulse which occurs 10 milliseconds only after the beginning of the start signal, that is to say after relay R is operated, operates the pair of relays *Sta*, *Stax*. At the end of the first impulse when relay *Gr* releases, relay I operates and sets up a circuit for the reception of the first code signal. This signal, received by relay $R_2$, is applied to the receiving relay A through relay *Fr* operated, relay I also operated and the back contact of relay I*x*, and finally, relay A and battery.

According to the nature of the signal received by relay $R_2$ this relay moves its armature on the right contact which is grounded (for a positive signal), or on its left contact which is isolated (for a negative signal). According to the position assumed by relay $R_2$, relay A operates or remains idle when relay *Fr* closed its make contact.

It is known that the quality of a telegraphic receiver is expressed in terms of the speed at which it is capable to register a signal. The reception of a signal transmitted with a duration of 20 milliseconds must be as short as possible in order to take into account the distortion of the signals during transmission. This depends in the present case on the speed of relays A, B, C, D, and E. By the use of special relays, as used in automatic telephony, it is possible to arrive at operation time in the neighbourhood of 1 millisecond. Relay *Fr* must then close its make contact for a length of time just exceeding the operation time of receiving relay A, B, etc., that is to say every 1 to 2 milliseconds.

When relays A, B, C, etc. are replaced by telegraphic relays this time may even be reduced.

In the case when relays are replaced by vacuum tubes, these times may be reduced 200 microseconds each sufficient to prime a gas tube; in this case, the reception margin of the device is even increased.

At the same time when the circuit of *Fr*, Figure 2, is closed, relay *Gr*, Figure 2, operates and opens the short circuit on relay I*x* which operates in series with relay I. Relay I is slower to operate than rleay A, and this last relay has enough time to lock itself before its circuit is opened by I*x*.

The operation of I*x* opens the locking circuit of relays of *Sta* and *Stax* which fall back. The signal registered by relay A is transferred on to relay B, by the make contact of I*x*.

Figure 3:
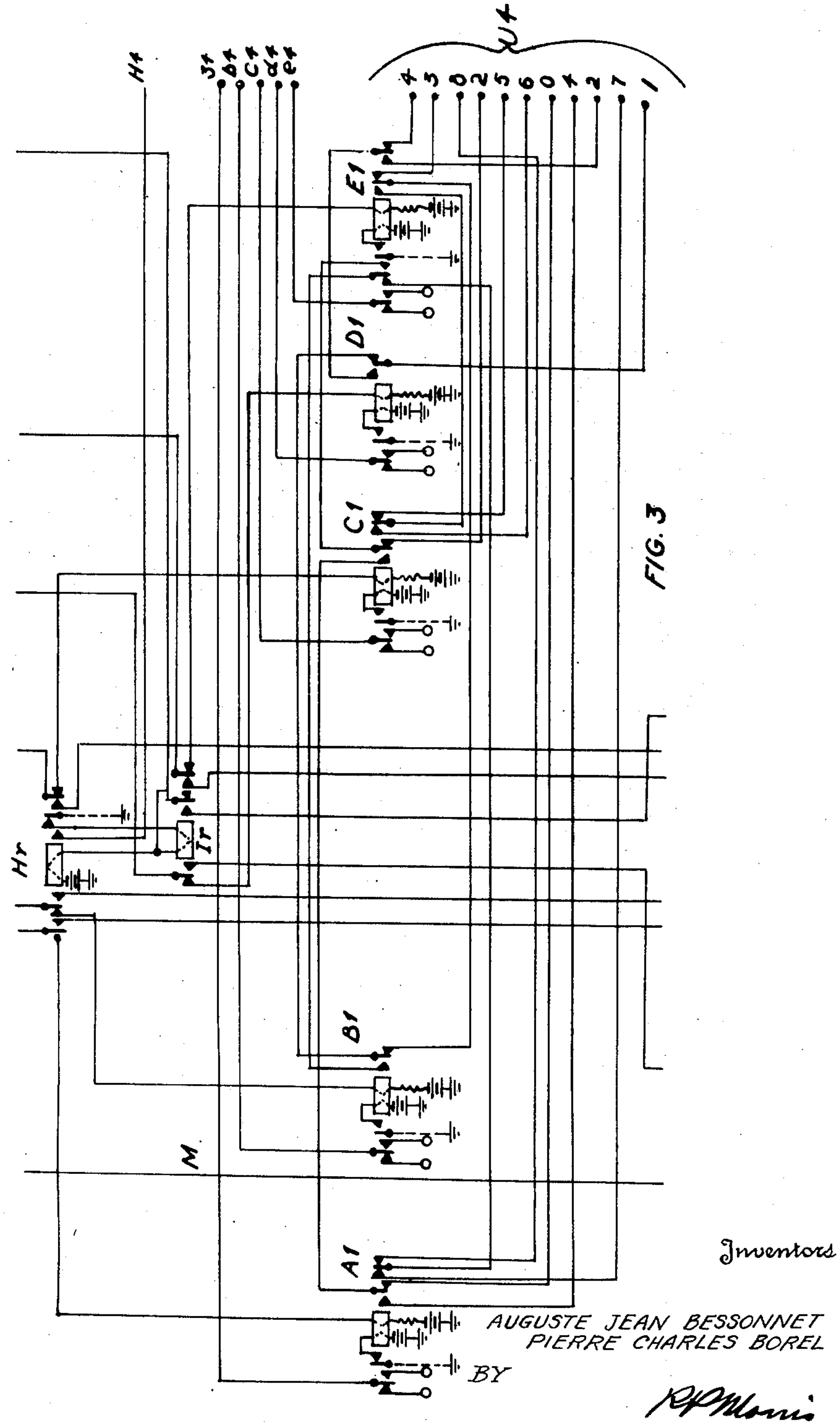
Figure 3 shows the circuit of the first marking relay for recording the first number in one embodiment of the invention.

The signal received by relay B will then be transferred on relay BI, Figure 3, and the same applies to the five elementary code signals.

When relay *Stox* operates, that is to say after reception of the "stop" signal, the set of switching relay *Hr* and *Ir* operates. The next number will then be transferred on relay A2, B2, etc. not shown in the figures. If the number of the subscriber has five figures, the last relay operated will be A5, B5 on Figure 4.

Figure 4:
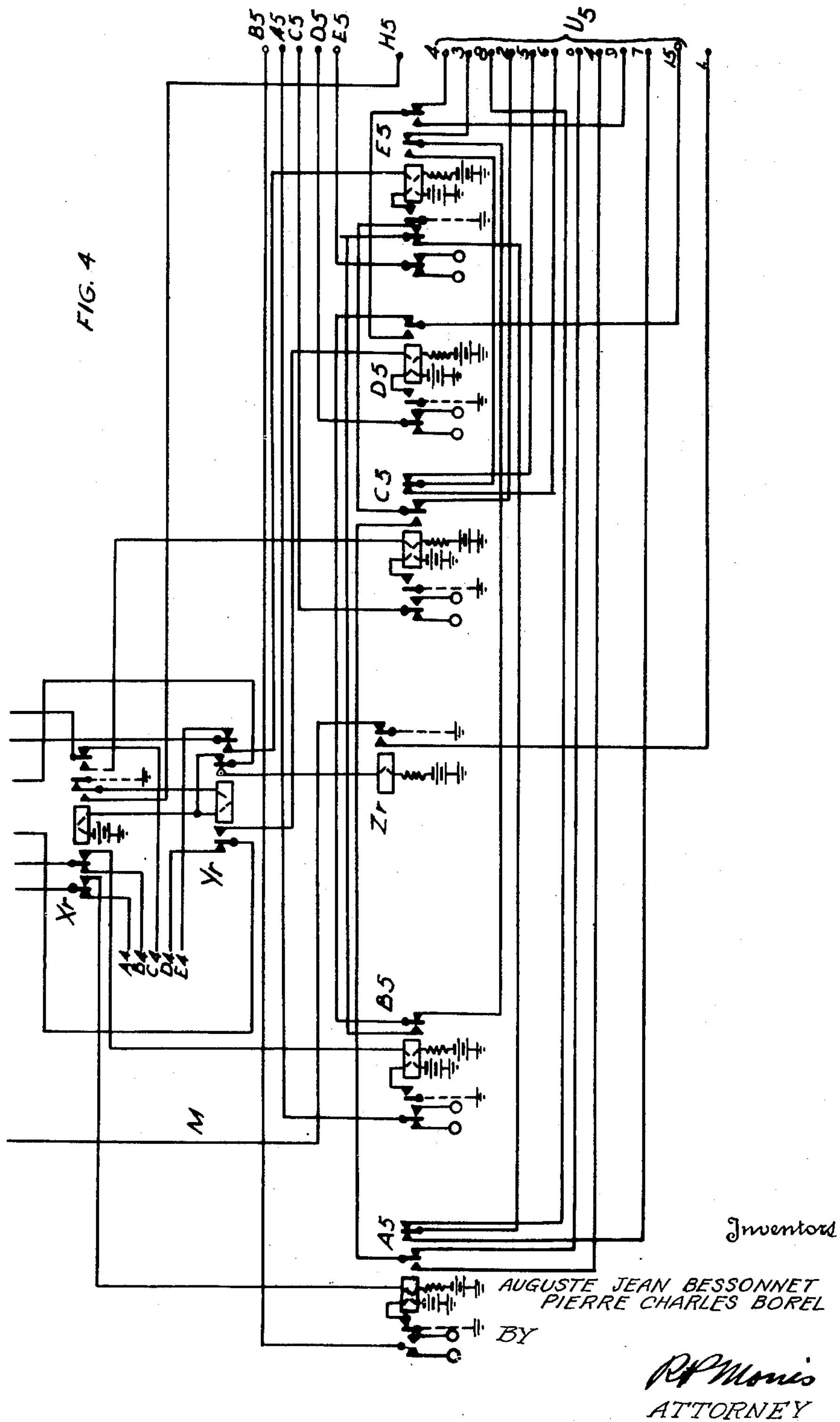
Figure 4 shows a relay circuit for the recording of the last number in one embodiment of the invention.

After reception of the last signal of the last number relay *Zr*, Figure 4, operates and opens the control ground of the counting relay in order to avoid the possible recording of a wrong combination in the case when the subscriber sends an additional number.

After the reception of the numbers, the recording relays produce the indication of the telegraphic alphabet used; for instance, if number 2 has been received, relays A, B, and E operate alone; for number 4, relays B and D operate; and for No. 6, relays A, C, and E.

It might be shown in the same manner that the third impulse of Fr and Gr would lock the pair of counting relay 2, and 2x would cause 1 and 1x to fall back and B to be in the marking position, the marking being then transferred to B3. Moreover, A, if it were operated, would fall back, since it would no longer find a ground through the break contact of 2.

Other relays operate consecutively, and the line number is recorded by relays A, B, C, D, E.

The seventh impulse is the "stop" impulse. This seventh impulse repeated by relay Gr operates relay Sto through: ground, break contact of Zr, Figure 4, lead M, break contact of Gr, make contact of 5x, winding of Sto, resistance, battery. When Gr operates opening the break contact thereof, Stox operates and Sto and Stox lock over: battery, resistance, winding of Sto, winding of Stox, make contact of Stax, ground. S is idle waiting for the next number. E falls back if it is operated; moreover, relay Hr of the pair of switching relays Hr—Ir is operated through ground, make of Stox, break of Ir, winding of Hr, battery.

The second set of impulses corresponding to the second number causes the operation of S. The first impulse of S locks Sta, Stax, which causes Sto and Stox to fall back. When falling back Sto and Stox cause Ir to operate and lock itself. The switching for the second set of marking relays is then ready. The impulses will therefore be recorded by the second set of recording relays, and so on up to relays A5, B5, C5, D5, E5.

When the recording of the last number operates Stox, relay Zr operates through: ground, make of Stox, make of Ir, the several operating circuits of the switching relays (the last of which is Yr, Figure 4), winding of Zr, resistance, battery, and opens the ground on armature of Gr, Figure 2.

The operation may be explained in detail as follows: Referring to Figure 2, relay R, by its upper contact corresponding to the signal "start" operates the device S which beats at the same rhythm as the impulses. Relays Fr and Gr will operate at the same rhythm. Relay Fr will beat when R2 receives the "start" signals. The pair of relays Sta, Stax operates through: ground of Zr, Figure 4, lead M, and in Figure 2 break contact of Gr, break of 5x, break contact of 4x, break of 3x, break of 2x, break of 1x, break of Stax, winding of Sta, resistance, battery; Sta operates, therefore, but Stax remains idle, since it is short-circuited. But if Gr operates the ground on the make contact of Gr is open, Stax does not find a ground any longer and operates through: ground, break of 1x, make of Sta, winding of Stax, winding of Sta, resistance, battery. Thus the pair of relays Sta, Stax is operated.

The second impulse which is the first code impulse arrives. Then Gr and Fr beat, Gr when in the rest position operates the relay through: ground in the rest position of Zr, Figure 4, then in Figure 2 break of Gr, break of 5x, break of 4x, 3x, and 2x, break of 1x, make of Stax, winding of 1, resistance, and battery, 1 therefore operates. But, at the same time, relay A is connected to the armature of R2 by make of Fr, make of 1, break of 1x, winding of A, resistance and battery. According to the position of the armature of R2, that is to say according to the nature of the impulse, A operates or does not operate. If it operates, it locks itself through the battery, resistance, winding of A make of A, break of 2x, ground. When Gr operates the ground from Zr which operated 1 is open and 1x operates through: ground, break of 2x, make of 1, winding of 1x, winding of 1, resistance, and battery.

The indication characterized by A is immediately transferred on the recording relay of Figure 3 through (shown in Figure 2): ground, break of 2x, make of A, make of 1x, and in Figure 3 break of Hr, winding of A1, resistance, battery. If A is operated A1 operates and locks itself on the battery by a second winding, and its own make contact and the ground. If A is not operated A1 remains at rest. Therefore, A1 records the code as marked by A.

The two relays Sta, Stax fall back, since they no longer find a ground through the break contact of 1x which is operated.

Finally, when the last set of impulses has been received, the position of the relay is as follows: In Figure 3, relay Hr, when operated, has connected a ground on the wire H.

Moreover, each of the recording relays has placed either a positive potential or a negative potential according to its position on one of the wires a, b, c, d, e. These positions correspond to the code combination received.

The wires U1 go to the register and make it register the number received. For example, if No. 2 has been sent A1, B1, and E1 are operated, C1 and D1 at rest according to the table of Figure 8. A ground is then put on wire 2, through break of C1, make of E1, make of B1, break of D1, wire J1 which has a ground on it. It may be noted that the position of A1 is indifferent; by going back to the code table it may be seen that number 2 is the only one which corresponds to B+, C−, D−, E+.

The pair of relays, Hr—Ir, has changed the position of the switching relay and connected the group of relays A2, B2, C2, D2, E2 (not shown), to the counting relays. After the A2 . . . E2 group of relays has operated to place a potential on one of the outgoing wires of the group of wires U2 (not shown) corresponding to the second code signal received, the pair of relays Hr—Ir will connect the group of relays A3 . . . E3 to the counting relays, etc., until the group of relays A5 . . . E5 have been set and excited the corresponding wire of the group of wires U5.

What has been explained for the recording of the first number applies as well to the other groups of relays up to the last one in the present embodiment A5 . . . E5.

There is, however, for the last number a small difference. Relays Xr and Yr, Figure 4, are the switching relays of the fourth number. When the fourth number has been recorded, relays Xr and Yr are locked. The recording of the last number is made in the same way as that of the other numbers until Stox is operated. When Stox operates, the ground on the right make contact of relay Stox operates relays Zr through: ground, contact of Stox, make of Ir, Figure 3, and the other switching relay up to Yr, Figure 4, winding of Zr, Figure 4, resistance, battery.

The operated relay Zr connects the ground on conductor L and this ground characterises the end of the reception of the numbers.

At the same time, relay Zr opens the ground on conductor M and this prevents Gr, Figure 2, from operating the counting relays in the case when the subscriber sends, by mistake, another train of impulses.

The recording relays are connected to the register by the set of conductors U1 . . . U5, and the conductors J1 . . . J5. The register which may be of the same general type as that disclosed in U. S. Patent No. 1,941,085 issued on December 23, 1923, to A. E. Hague et al., will select locally the wanted junction or will retransmit the impulses according to the connections which have been made.

When the system is provided with means for controlling the different selections, two cases may occur:

First, the numbers received in an exchange must be repeated and sent to another exchange without alteration (telegraphic code);

Second, the numbers received must be translated in order to control one of several local selections.

In the first case, the signals are repeated and sent to the distant exchange in the following way: As soon as a number is received, relays A, B, C, D, and E transfer the number to the recording relays A1-5, B1-5, etc.; and when the distant exchange is ready to receive these signals, that is to say, when relays Hr (for the first number) and Sr (Fig. 6, controlled by the distant exchange) are operated, a ground is connected to the synchronization circuit S2 which, as receiving system S, may be mechanical or static (electronic).

Relay Eir sends, then, an impulse every 20 milliseconds. Before the first impulse relay T1 sends on the line, towards the distant exchange, a positive signal. At the first impulse, relays Eir, Figure 6, and T2 operate. The operation of relay Eir opens the short circuit on relay Eax which will then operate and the operation of T2 opens the short circuit on relay T1 which will bring its armature on the negative contact, since this relay has received a negative current through: negative battery, resistance, break contact of Eax, make of Ea, T1, and ground. When relay Eir falls back, relay E1 operates and closes the circuit of relay T1 towards the recording relay A1; according to the position of these recording relays (A1 to E1), T1 will receive a positive or negative signal whenever its short-circuit is opened by T2 and will thus send every 20 milliseconds a positive or negative signal according to the number received and recorded by relays A1, B1, etc.

The positive "stop" impulse is sent by the pair of counting relays Eo, Eox.

Figure 7:
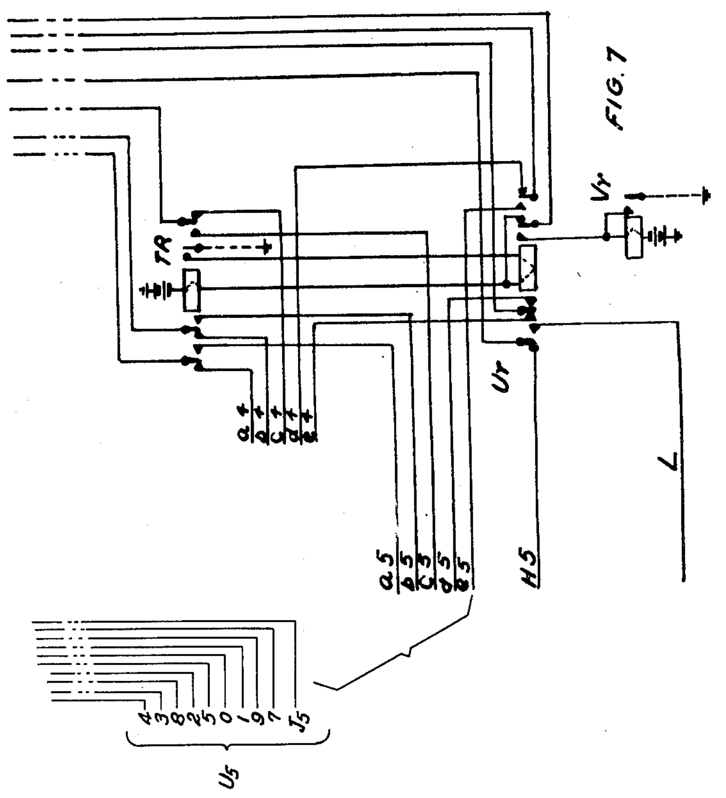
Figure 7 shows a schematic of one final switching circuit for the repetition of the last number in one embodiment of the invention.
Figure 1:
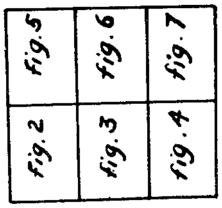
Figure 1 is an assembly chart of the different figures.

The penultimate pair of counting relays E5, E5x operates the switching relays Tr, Ur (Fig. 7).

The second number retransmitted will then be the same as the elementary signals recorded by relays A2, B2, etc.

When the last number has been thus sent, relay Vr (Fig. 7) operates and causes the circuit to come back to rest position.

In the case when the numbers received must be utilized to control a local selection, relays A1, B1, etc. prepare, according to their position, operated or at rest, a marking circuit for the different selection stages.

All the known marking means may be used, battery or direct ground, multiphase or multipotential systems.

The detailed operation will now be given in the case when the impulses are repeated and in the case of local selections.

Relays Kr and Lr are the relays of the register. Relay Kr is operated (by means not shown) in case of a local selection, relay Lr marks the end of a local selection by an impulse.

In the case of retransmission, it is known that Kr is at rest. The distant exchange is connected by conductor T for transmission, and conductor R for reception.

When the distant exchange is ready to receive the numbers, it operates relay Sr. The circuit S2 operates through: ground on the make contact of relay Hr, Figure 3, conductor H, make of Sr, Figure 6, break of Mr, break of Kr, circuit S2.

Figure 5:
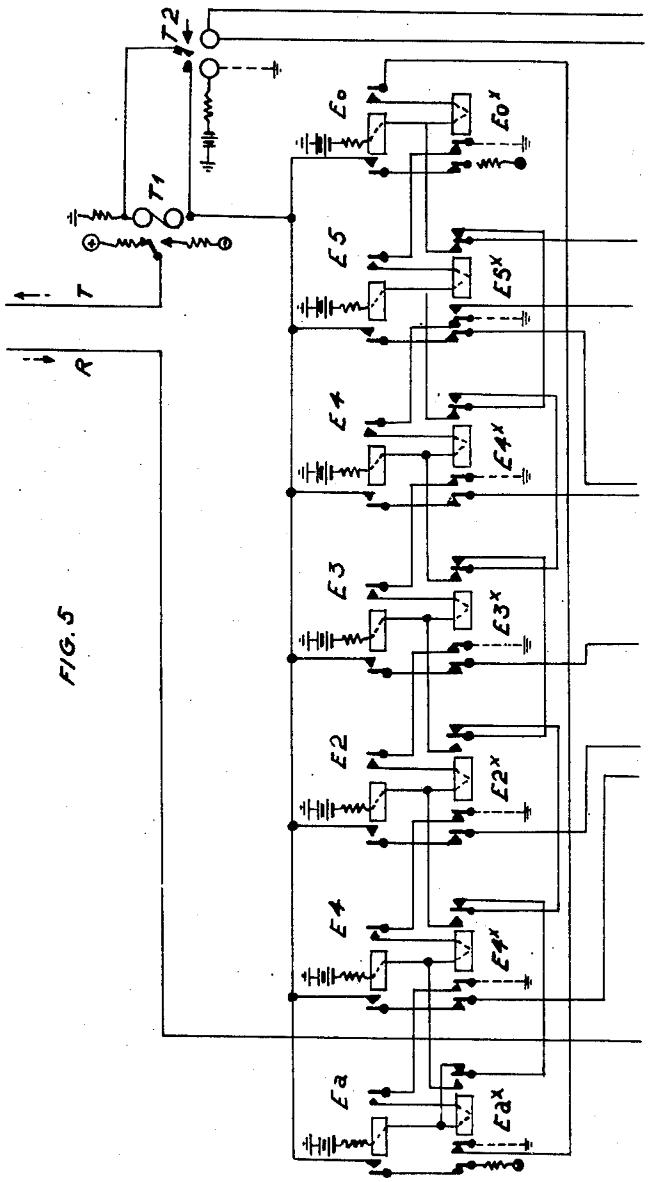
Figure 5 shows a schematic of a repetition circuit in one embodiment of the invention.
Figure 6:
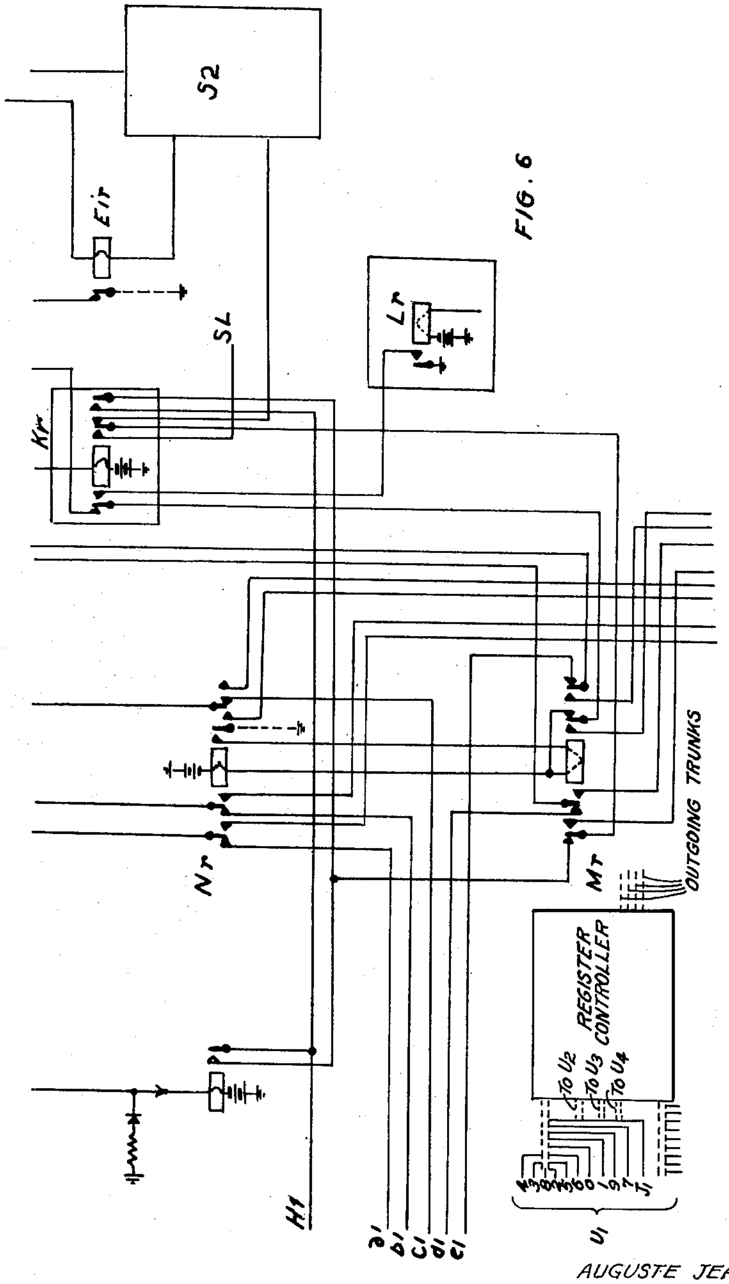
Figure 6 shows a schematic of a first switching circuit for the repetition of the first number in one embodiment of the invention, and also the relays of a register circuit.

Circuit S2, Figure 6, sends impulses which cause relay Eir, Figure 6, and relay T2, Figure 5, to beat.

The break contact of relay Eir operates relay Ea through ground, break of Eir, Figure 6, break of E5x (Fig. 5), break of E4x, break of E3x, break of E2x, break of E1x, break of Eax, winding of Ea, resistance, battery. Ea operates. Eax does not operate since it is short-circuited by the break contact of Eax.

A negative potential is applied to relay T1, negative potential, resistance, break of Eax, make of Ea, relay T1, resistance, ground; T1, however, does not operate, since it is short-circuited by the armature of relay T2 on its left contact.

When Eir operates, Eax operates, since it is no longer short-circuited by the break contact of Eir. The pair of mounting relays Eax, Ea operates through: battery, resistance, winding of Ea, winding of Eax, make of Ea, break of E1x, and ground. But during the time of operation of Eax, the contact of T2 has left the left position, and T1, operated by the negative potential, has assumed its negative position and has sent an impulse of negative potential on the line, this impulse is the "start" signal. When Eir falls back; relay E1 operates by the ground of Eir in the rest position and successively break contacts of Eox, E5x, E4x, E3x, E2x, E1x, winding of E1, resistance, battery. The potential registered by A1 appears on relay T1 as a positive potential with a resistance, or a negative potential with a resistance, through make or break contact of A1, Figure 3, according to whether A1 has registered a positive impulse or a negative impulse through conductor a, break of Nr, break of E1x, make of E1, but T1 does not operate, since it is short-circuited by the contact of T2. When S2 sends an impulse, T2 operates, the short circuit of T1 is open and at the same time E1x operates and one impulse, negative or positive, is sent on the line. This impulse depends on the position of A1 and repeats the impulse registered by A1. E1x operates by the make contact of Eir which cuts the ground on the rest contact of E1x through the rest contacts of the counting relays Eox, E5x, E4x, E3x, E2x. E1 and E1x operate through: battery, resistance, winding E1, winding E1x, make of E1, break of E2x, and ground. The pair of relays Ea, Eax falls back, since it is disconnected from its locking ground from E1x.

In a similar manner, the pair E2, E2x repeats the recording of B1, the pair E3, E3x repeats the recording of C, and E4, E4x the recording of D; and finally, E5, E5x the recording D1. Moreover, E5x prepares a switching circuit through the ground, make of $Erx$, break of $Kr$, break of $Mr$, winding $Nr$, and battery.

$Eo$, $Eox$ send the signal "stop" and moreover, by causing $E5x$ to fall back, completes the switching circuit by opening the ground on the make contact of $E5x$.

The pair of counting relays $Nr$, $Mr$ is operated through: battery, winding $Nr$, winding $Mr$, make $Nr$ and ground. The second set of recording relays is connected to the counting relays.

This applies consecutively up to the fifth set of relays. For the fourth set of relays, as for the others, as soon as the switching is completed, the ground, which is present on $Hr$, starts the circuit S2 through: ground in $Xr$, conductor H5, rest contacts $Ur$, contact in series of the switching relays, break contacts $Kr$ and S2.

When the repetition of the fourth number is completed, the pair of switching relays is locked, and for the 5th number, the ground which operates S2 is given by the make contact of $Zr$ through: ground make of $Zr$ conductor, Z, make of $Ur$, the make contacts of the other switching relays, rest of $Kr$ and circuit S2.

When $Er$ operates during the retransmission of the fifth number, a ground is placed on relay $Vr$ which locks. The relay $Vr$ is the last to operate. This relay must bring the system to the rest position but the manner in which the system comes back to rest is not described here.

In the case when there are local selections, the local selections are made by means of devices which will not be described here, except for the following details: The relay $Kr$ is operated and the successive grounds which appear on the armature of the changeover contacts on the right of $Kr$, instead of being sent on S2 are directed on conductor S1 which leads to the starting circuit of the selectors which are not shown. When a local selection is over, $Lr$ supplies the ground that locks the switching relay through: ground, make of $Lr$, make of $Kr$, break of $Mr$, winding of $Nr$, battery; and when $Lr$ falls back, $Mr$ operates through: battery, winding of $Nr$, winding of $Mr$, make of $Nr$. The result is then that each local selection operates the pair of switching relays. When the local selections are over, the retransmissions are made in the way which has already been described.

As an alternative, one may mention a device in which $Fr$, Figure 2, would have its contact directly on the line, relays A, B, C, D, and E being telegraph relays. In the same manner, the connections of the recording relays show only the "number" combinations but could also be prepared for the "letter" combinations. In the example of an embodiment described, the recording A, B, C, etc. supplies the potentials necessary for the retransmission of signals. It may be noted that these relays control a register or a similar device, and that this register may also supply the potentials for the transmission. The signals sent out may be completely different from the received signal. The register of any other circuit may even operate an impulse repetition device independent of the receiving and registering circuit. This use is according to the invention contemplated, in particular, for signalling and controlling purposes in the exploitation of a telegraphic or teleprinting network. The same devices may as well transmit the number of the called subscriber for establishing the connection or the signalling control signal.

Although the invention has been described in relation to an embodiment applied to an automatic system, it is clear that it is in no way limited to this particular example and that this embodiment may, be modified in many ways within the scope of the invention in order to apply it to telecontrol systems, local and long distance telephony, signal systems, etc.

We claim:

1. A telegraph switching system comprising means for receiving telegraph code signals including a start signal and a stop signal, a plurality of counting relays, a plurality of registering relays, associated respectively with said counting relays, means associated with said receiving means and responsive to said start signal for causing succeeding pulses of the received signal to operate said counting relays in succession, means responsive to the operation of each counting relay to cause the associated registering relay to operate or not depending on the polarity of the particular code pulse, a plurality of groups of recording relays, means for connecting one group of recording relays to said registering relays and for operating the recording relays of the group in accordance with the operation of the registering relays during the receipt of a first signal, means responsive to said stop signal to shift said last mentioned means so as to connect successively the other groups of said plurality groups of recording relays to said registering relays, and means for connecting said groups of recording relays for controlling selective apparatus adapted to operate in response to the combination of the particular condition of the recording relays of said plurality of groups.

2. Telegraph switching system according to claim 1, in which the counting relays comprise sets of pairs of relays in which the first relay of a pair is operated when a pulse is supplied and the second relay of said pair is connected to be operated and hold with the first relay when the pulse is suppressed.

AUGUSTE JEAN BESSONNET.
PIERRE CHARLES BOREL.

REFERENCES CITED

The following references are of record in the file of this patent:

UNITED STATES PATENTS

| Number | Name | Date |
|---|---|---|
| 1,000,078 | Cummings et al. | Aug. 8, 1911 |
| 1,105,492 | Clement | July 28, 1914 |
| 1,264,517 | Herink | Apr. 30, 1918 |
| 1,588,764 | Lubberger | June 15, 1926 |
| 1,929,669 | Arter | Oct. 10, 1933 |
| 2,248,937 | Bellamy et al. | July 15, 1941 |